Aug. 19, 1952     G. W. JOHNSON     2,607,073
POULTRY SCALDER

Filed Jan. 15, 1947     4 Sheets-Sheet 1

INVENTOR,
Gordon W. Johnson.
BY
Roy E. Hamilton,
Attorney.

Aug. 19, 1952 G. W. JOHNSON 2,607,073
POULTRY SCALDER
Filed Jan. 15, 1947 4 Sheets-Sheet 3

INVENTOR,
Gordon W. Johnson.
BY
Roy E. Hamilton,
Attorney.

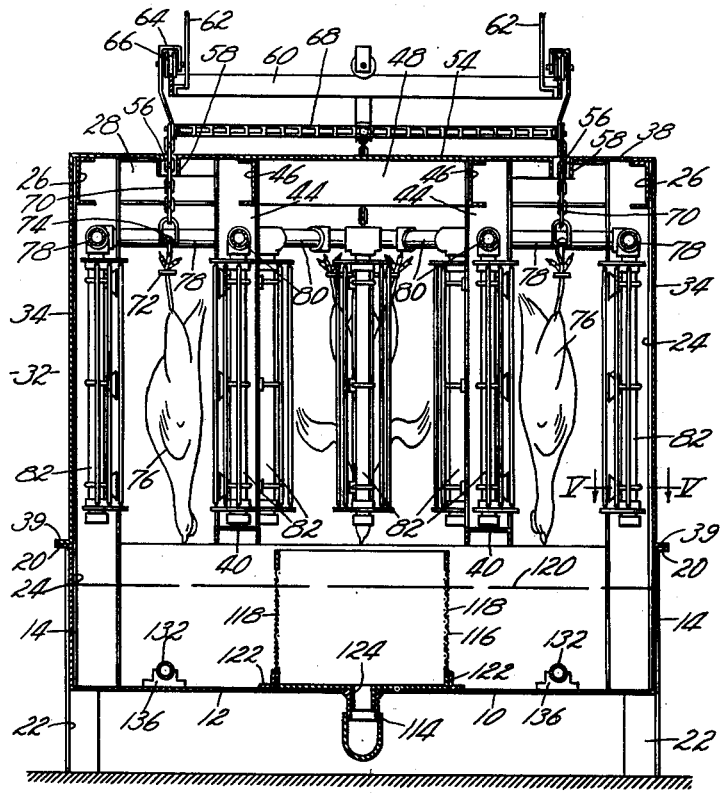
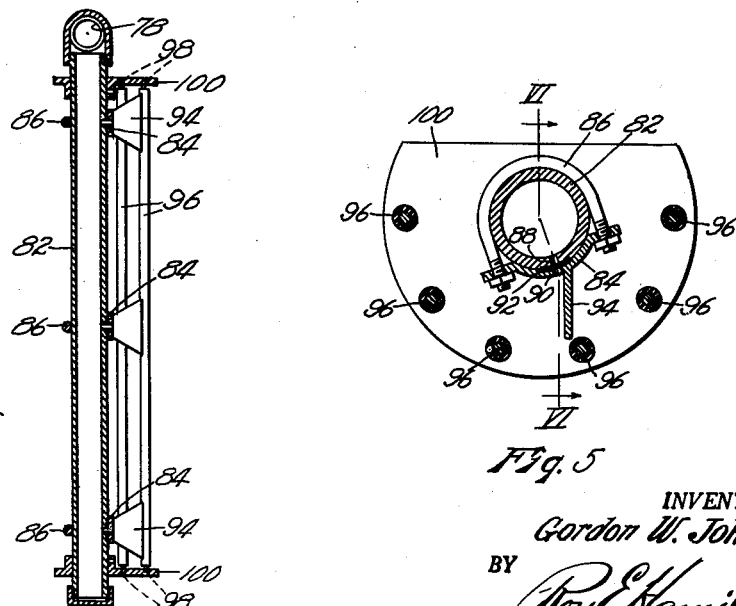

Patented Aug. 19, 1952

2,607,073

UNITED STATES PATENT OFFICE 2,607,073

POULTRY SCALDER

Gordon W. Johnson, Raytown, Mo., assignor to Gordon Johnson Company, Kansas City, Mo., a corporation of Missouri Application January 15, 1947, Serial No. 722,100

3 Claims. (Cl. 17—11.2)

This invention relates to new and useful improvements in a poultry scalder, and has particular reference to an apparatus for scalding poultry as it is moved along a conveyor line.

The principal object of the present invention is the provision of a poultry scalder wherein a series of knife-edged sprays of hot water successively impinge on a fowl as it is moved through said scalder on a conveyor line.

Another object is the provision of a poultry scalder wherein a fowl suspended from a moving conveyor by means of a swivel connection passes successively through a series of thin, high-velocity sprays of hot water, said sprays being so disposed as to cause said fowl to turn alternately in opposite directions on said swivel connection, thereby obtaining thorough penetration of the feathers of the fowl.

A further object is the doubling of the conveyor line within the confines of the scalder cabinet, thereby permitting said scalder cabinet to be more compact.

Other objects are simplicity and economy of construction, and ease and dependability of operation.

With these objects in view, as well as further objects which will become apparent during the course of the specification, reference will be had to the drawings, wherein:

Fig. 4 is a vertical section taken on line IV—IV of Figure 1.

Fig. 5 is an enlarged fragmentary horizontal section taken on line V—V of Figure 4, showing one of the spray heads and its protecting rods.

Fig. 6 is a reduced vertical section taken on line VI—VI of Figure 5.

Figure 1:
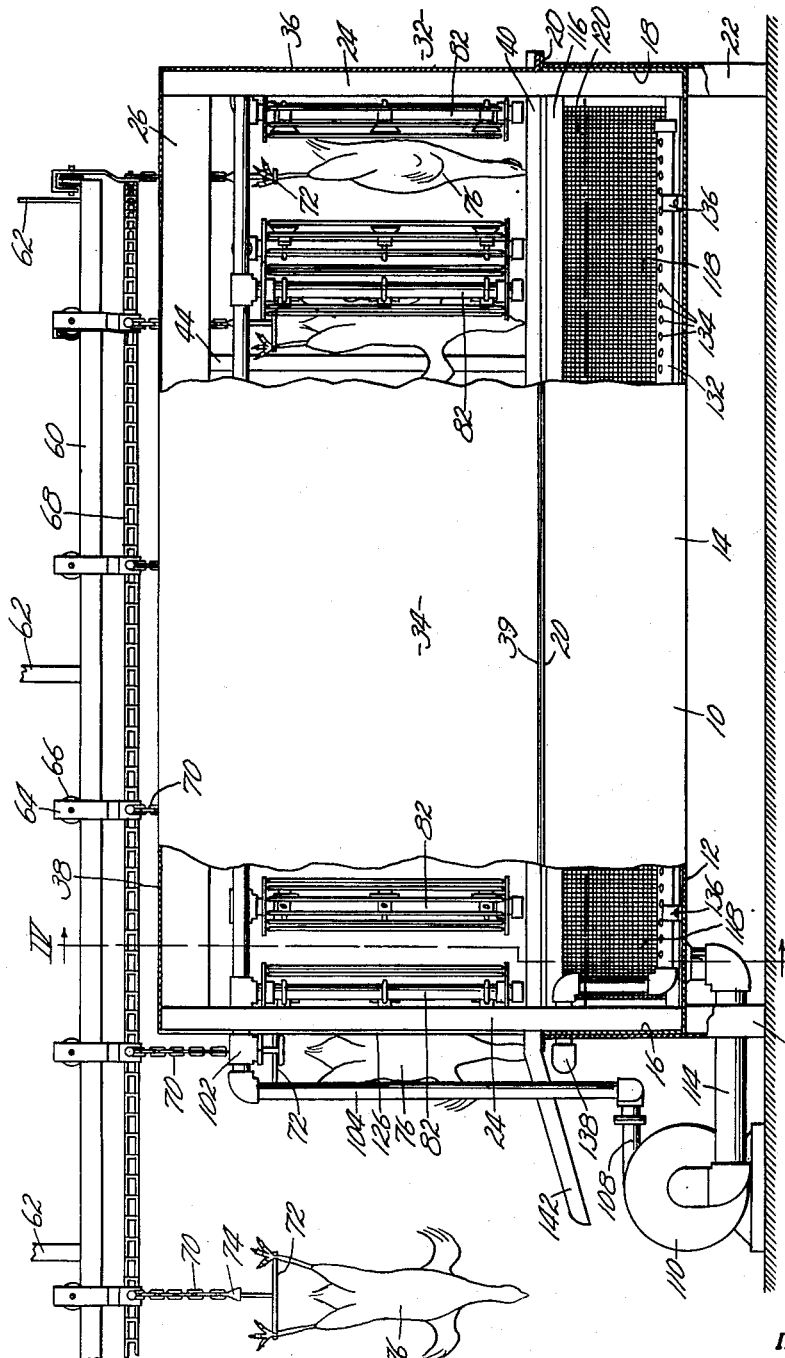
Figure 1 is a side elevation of a poultry scalder embodying the present invention shown in operative relationship to a conveyor line from which fowls are suspended, and with the right side panels partially broken away to show the interior.

Like reference numerals apply to similar parts throughout the several views, and the numeral 10 applies to a tank, said tank being open at the top and having a bottom 12, sides 14, front 16 and back 18. An outwardly turned flange 20 is provided at the upper edges of said sides, front, and back. Said tank is supported above the floor by four legs 22 rigidly fixed to said tank at the corners thereof.

Four channel iron corner pieces 24, rigidly fixed in the corners of tank 10 and extending vertically upwardly therefrom, support at their upper ends a horizontal rectangular frame, comprising side members 26, rear member 28, and a short front member 30 extending inwardly from each of front corner members 24. Said corner members and said horizontal frame support a cabinet 32 open at the front and bottom and comprising side panels 34, back panel 36, and top panel 38, said side and back panels having an outwardly turned flange 39 at the lower edges thereof, which is rigidly fixed to flange 20 of tank 10. Said top panel is provided with a large U-shaped aperture cut therein, said aperture extending from the front of said panel to a point adjacent its rearward edge.

Figure 2:
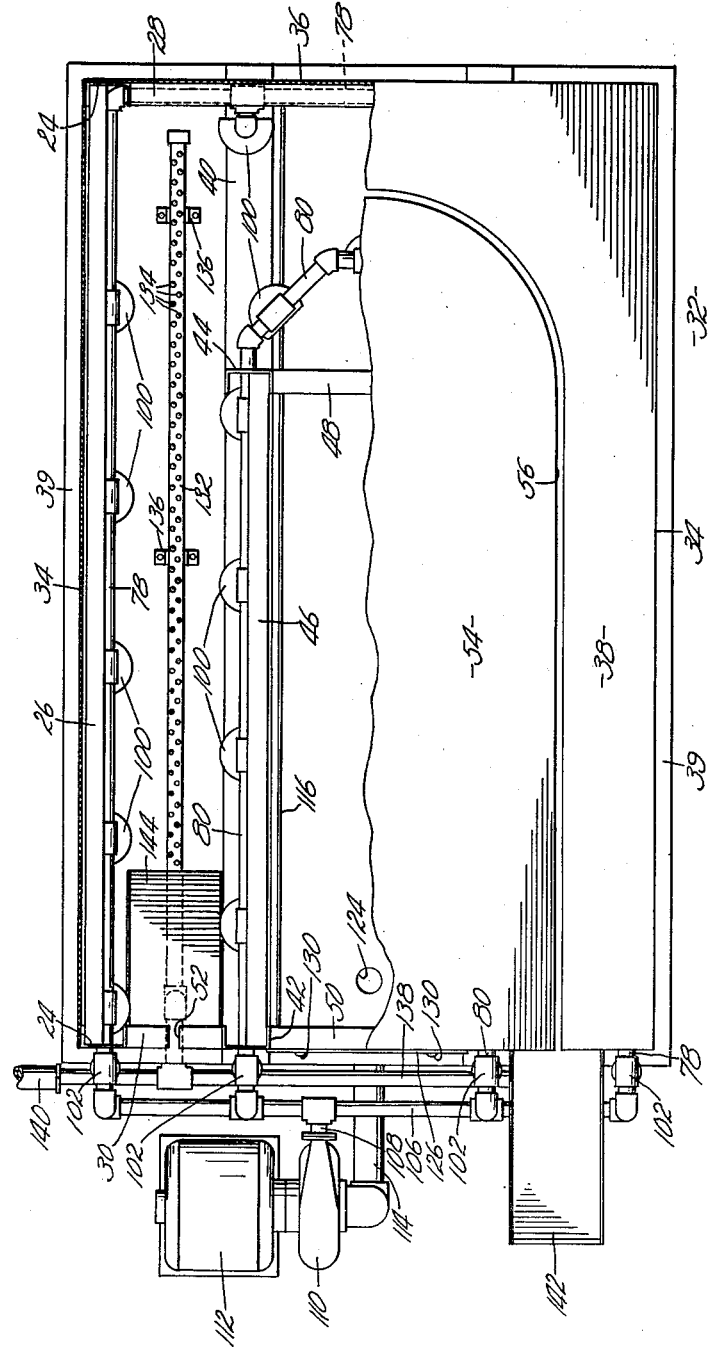
Fig. 2 is a plan view of the scalder, with the top panel partially broken away.
Figure 3:
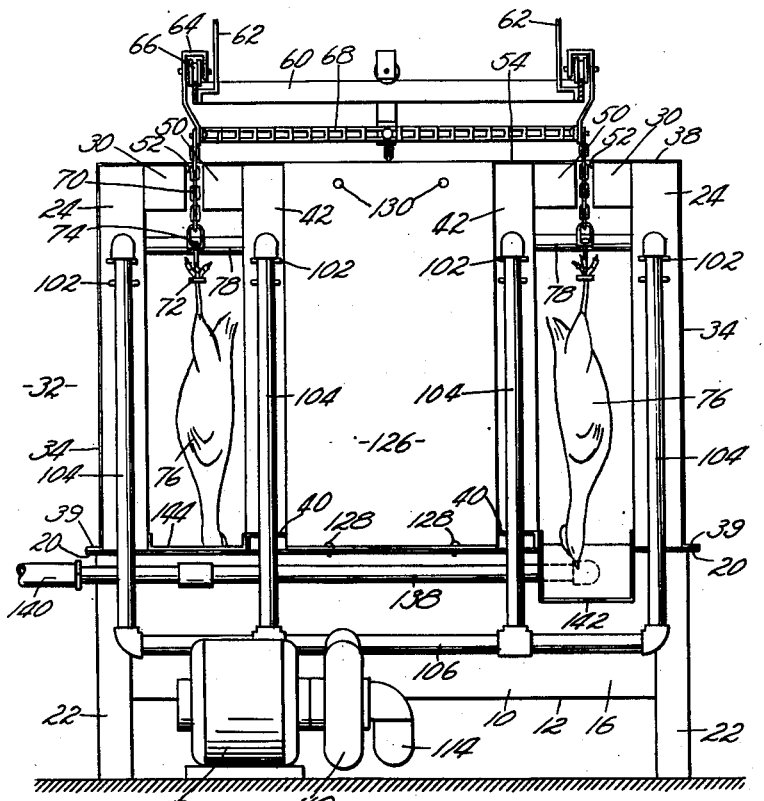
Fig. 3 is a front elevation of the scalder.

Two parallel channel iron support beams 40 extend horizontally from the front to the back of cabinet 32 in spaced apart relation from the sides of said cabinet, and are rigidly attached at their ends to flange 20 of tank 10. A vertically upwardly extending support 42 is rigidly fixed to each of said beams at the forward end thereof, and a similar support 44 is rigidly fixed to each of said beams at a point intermediate its ends. Supports 42 and 44 carry at their upper ends a horizontal rectangular frame comprising side members 46, rear member 48, and front member 50, said front member extending outwardly beyond upright supports 42 to points adjacent the inward ends of members 30, leaving a space 52 therebetween. Said horizontal frame supports a U-shaped panel 54 co-planar with top panel 38, the edges of said U-shaped panel being spaced apart from the edges of panel 38 to provide a continuous U-shaped slot 56 therebetween, as shown in Figure 2, to provide for the passage of the fowl supporting chains as hereinafter described. The forward ends of said slot coincide with spaces 52 between front frame members 30 and 50, and the edges of panels 38 and 54 adjacent said slot are bent to provide downwardly projecting flanges 58.

A conveyor rail 60 is carried substantially over slot 56 by supporting members 62. A plurality of brackets 64 each carry for rotation a roller 66 adapted to roll along said rail. Said brackets are maintained in spaced relationship along said rail, and moved along said rail by a conveyor chain 68 connecting the downwardly extended ends of said brackets. Suspended from each of said brackets is a chain 70. Chain 70 hangs downwardly through slot 56 and carries at its lower end a shackle 72 supported by swivel connection 74. Said shackle may be of any type suitable for engaging the legs of a fowl 76.

A pipe 78 extends horizontally into cabinet 32 through a hole provided in left front corner piece 24 adjacent the upper end thereof, rearwardly adjacent left side panel 34, through a flange of left rear corner piece 24, across the cabinet adjacent back panel 36, through a flange of right rear corner piece 24, forwardly adjacent right side panel 34, and through right front corner piece 24. A pipe 80 extends horizontally into cabinet 32 through a hole provided in left front support 42 adjacent the upper end thereof, rearwardly through left rear support 44, transversely across said cabinet, through right rear support 44, and forwardly through right front support 42. Extending downwardly from pipes 78 and 80 and interconnected therewith, are a plurality of spaced spray tubes 82. The spray tubes carried by pipe 78 are disposed in staggered relation with the spray tubes carried by pipe 80, as shown diagrammatically in Figure 7, whereby a fowl carried between pipes 78 and 80 by the conveyor will be struck alternately by sprays from either pipe.

As clearly shown in Figures 5 and 6, a plurality of spray heads 84 are securely clamped to each spray tube 82 in spaced relationship along said tube, by means of U-bolts 86. A hole 88 bored in the tube coincides with a hole 90 provided in said spray head, and a gasket 92 maintains a seal between said tube and said spray head. A deflector plate 94 integral with each spray head deflects water passing through hole 90 into a vertically disposed flat spray. Fowls passing before said sprays are prevented from accidentially catching on or becoming entangled with said spray heads by means of a plurality of rubber covered rods 96 disposed parallel to each of pipes 82 and spaced apart from said pipe a distance slightly greater than the length of deflector plates 94. The ends of said rods are carried for rotation in sockets 98 provided in plates 100, which are rigidly attached to pipe 82 adjacent the upper and lower ends thereof.

Pipes 78 and 80 are equipped with valves 102 adjacent their forward ends, and are interconnected at their forward ends with downwardly extending pipes 104. Said pipes are interconnected at their lower ends with a common supply pipe 106, said pipe being interconnected by pipe 108 with the delivery side of pump 110. Said pump is carried by and directly driven by motor 112, which rests on the floor in front of tank 10.

A drain pipe 114 interconnects the bottom of tank 10 with the intake side of pump 110. A strainer trough 116 comprising a rectangular box open at the top and having screen sides 118, is removably contained in tank 10, extending substantially from front to back of said tank, and extending above the water level 120 in said tank. Said strainer trough is maintained laterally in the center of said tank by a pair of angle iron guides 122 securely fixed to the bottom of said tank. A short downspout 124 extending downwardly from the bottom of said strainer trough, is adapted to extend into drain pipe 114. Thus, water draining into tank 10 from the poultry being scalded must pass through screens 118 before returning to pump 110 for recirculation. Said screens will trap all feathers and other foreign material. Said strainer trough may be easily removed from tank 10 for cleaning by lifting the forward end thereof and pulling the trough forwardly through the space between forward supports 42. Normally the space between said supports may be closed by a removable access door 126 resting at its lower edge on flange 20, where it is positioned by pins 128 fixed to said door and extending through said flange, and removably fastened at its upper edge to front frame member by means of fasteners 130.

A pair of pipes 132 carried in tank 10 and extending substantially the length of said tank on either side of strainer trough 116 and adjacent the bottom of said tank, are provided with a plurality of perforations 134 through which steam may be passed to heat the water in said tank. Said pipes are supported on blocks 136 fixed to the bottom of tank 10. Said pipes extend through the front 16 of said tank, and are interconnected at their forward ends with pipe 138. A hose 140 is connected with said pipe and supplies steam to said pipe from any suitable source.

A trough 142 is rigidly fixed to flange 20 of tank 10 adjacent the right side of the front of said tank, and slopes downwardly away from said tank. Said trough is immediately beneath the fowls 76 as they enter cabinet 32, and assists in moving the depending head and neck of the fowl over the edge of tank 10 in case the fowl is long enough to hand below the top of the tank. A similar trough 144 fixed to flange 20 of tank 10 adjacent the left side of the front of said tank and sloping downwardly into said tank, assists in moving the heads and necks of fowl over the edge of said tank as said fowls exit from the cabinet.

Figure 7:
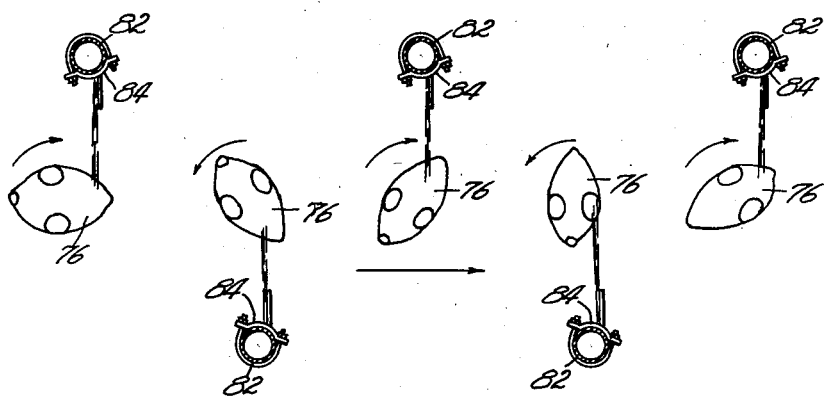
Fig. 7 is a diagrammatic plan view of a fowl as it is moved between the opposing staggered rows of sprays.

Referring to Figure 7, it will be seen that as a fowl is moved in a U-shaped path through cabinet 32 by the conveyor as described, it will pass alternately through sprays from tubes 82 carried by pipe 78, and sprays from tubes 82 carried by pipe 80. Since these spray tubes are in staggered relation, the fowl will be caused by the force of said sprays to rotate on swivel connections 74, first in one direction and then in the opposite direction, as indicated by arrows in Figure 7. This repeated reversal of rotation, combined with the penetrating effect of the thin, sheet-like sprays, provides an efficient means for rapidly and thoroughly soaking the feathers on all parts of the body. Another feature of the present invention is the inclusion of a large number of sprays within a comparatively compact cabinet, this desirable result being obtained by doubling the path of travel of the poultry as it passes through said cabinet.

It is apparent that many variations of details could be made without departing from the spirit of the invention, and it is therefore, desired to be limited only by the scope of the claims. The improvements I claim as new and desire to protect by Letters Patent are:

1. In a poultry scalder, a conveyor having means for supporting a bird to be scalded in suspended relationship thereto and for free rotation on a vertical axis; a pair of spaced, opposed rows of spray heads, each including a vertical row of spray nozzles disposed to direct jets of fluid against the bird as the latter is advanced by the conveyor, the spray heads of one row thereof being offset relative to the spray heads of the other row thereof whereby the bird is caused to swing on said vertical axis by the force of said jets of fluid as the same is advanced by the conveyor; and a plurality of spaced, vertical rods for each spray head respectively, and disposed between the bird and the spray heads to hold the bird against engagement with the spray heads.

2. In a poultry scalder as set forth in claim 1 wherein each spray nozzle is provided with a vertical deflector plate extending laterally from the spray heads within the path of travel of fluid emanating therefrom to form a diffused spray to impinge upon the bird, and wherein the vertical rods for each spray head respectively are disposed between the bird and the deflector plates to hold the bird against engagement with the deflector plates.

3. In a poultry scalder, a conveyor having means for supporting a bird to be scalded in suspended relationship thereto and for free rotation on a vertical axis; a pair of spaced, opposed rows of spray heads, each including a vertical row of spray nozzles disposed to direct jets of fluid against the bird as the latter is advanced by the conveyor, the spray heads of one row thereof being offset relative to the spray heads of the other row thereof whereby the bird is caused to swing on said vertical axis by the force of said jets of fluid as the same is advanced by the conveyor; and a vertical deflector plate extending laterally from the spray heads within the path of travel of fluid emanating therefrom to form a diffused spray to impinge upon the bird.

GORDON W. JOHNSON.

REFERENCES CITED

The following references are of record in the file of this patent:

UNITED STATES PATENTS

| Number | Name | Date |
| --- | --- | --- |
| 1,045,079 | Prunier et al. | Nov. 19, 1912 |
| 1,146,589 | Morrison | July 13, 1915 |
| 1,688,501 | Larsen | Oct. 23, 1928 |
| 2,412,338 | Jasper | Dec. 10, 1946 |